United States Patent [19]

Youn et al.

[11] Patent Number: 5,883,207
[45] Date of Patent: Mar. 16, 1999

[54] PROCESS FOR PREPARING ISOBUTENE CYCLOPENTADIENE-METHYLCYCLOPENTADIENE TERPOLYMERS

[75] Inventors: Hyun Kee Youn; Byung Woo Hwang; Chang Sun Chu; Yong Sik Chung; Gab Soo Han; Yong Hwa Yeom; Chang Jin Lee; Min Kee Jun; Ki Deok Park, all of Taejeon, Rep. of Korea

[73] Assignee: Daelim Industrial Co., Ltd., Seoul, Rep. of Korea

[21] Appl. No.: 809,236

[22] PCT Filed: Jul. 8, 1996

[86] PCT No.: PCT/KR96/00105

§ 371 Date: Mar. 19, 1997

§ 102(e) Date: Mar. 19, 1997

[87] PCT Pub. No.: WO97/05181

PCT Pub. Date: Feb. 13, 1997

[30] Foreign Application Priority Data

Jul. 27, 1995 [KR] Rep. of Korea .......... 7-22597
Apr. 4, 1996 [KR] Rep. of Korea .......... 8-10114

[51] Int. Cl.$^6$ .............. C08F 232/06; C08F 4/52
[52] U.S. Cl. ............ 526/185; 526/77; 526/237; 526/308; 526/348.7; 526/912
[58] Field of Search ............ 526/185, 237, 526/308, 281, 283, 348.7, 912

[56] References Cited

U.S. PATENT DOCUMENTS

| | | |
|---|---|---|
| 2,356,128 | 8/1944 | Thomas et al. . |
| 2,577,822 | 12/1951 | Sparks et al. . |
| 3,080,337 | 3/1963 | Minckler, Jr. et al. . |
| 3,165,503 | 1/1965 | Kahn et al. . |
| 3,356,661 | 12/1967 | Coleman . |
| 3,466,268 | 9/1969 | Barron et al. . |
| 3,808,177 | 4/1974 | Thaler et al. . |
| 3,856,763 | 12/1974 | Thaler et al. . |
| 4,031,300 | 6/1977 | Thaler et al. . |
| 4,139,695 | 2/1979 | Thaler et al. . |
| 4,153,773 | 5/1979 | Buckley et al. . |

*Primary Examiner*—Fred Teskin
*Attorney, Agent, or Firm*—Browning Bushman

[57] ABSTRACT

The present invention relates to a process for preparing isobutene-cyclodiene copolymers having a number-average molecular weight of at least 100,000 and an unsaturation of 1~30% by mol, characterized in that polymerization is carried out without gelation by reacting 75~99.5% by weight of an isobutene and 0.5~25% by weight of a cyclodiene or a mixture of cyclodiene as reaction materials, in a polar reaction solvent of 1~10 times by weight with respect to the reaction materials, wherein a catalyst solution of 0.02~2% by weight in the polar solvent is used in the amount of 0.2~2 times by weight with respect to the reaction materials, at a reaction temperature of −100°~−85° C., thereby obtaining a copolymer, and then removing the residual catalyst activity at a temperature of −100°~−25° C.

9 Claims, No Drawings

PROCESS FOR PREPARING ISOBUTENE CYCLOPENTADIENE-METHYLCYCLOPENTADIENE TERPOLYMERS

TECHNICAL FIELD

The present invention relates to a process for preparing isobutene-cyclodiene copolymers. More particularly, the present invention relates to a process for preparing isobutene-cyclodiene copolymers having a number-average molecular weight of at least 100,000 and a degree of unsaturation of 1~30% by mol, characterized in that polymerization is carried out by reacting isobutene with conjugated cyclic compounds such as cyclopentadiene, methylcyclopentadiene, cyclohexadiene, methylcyclohexadiene, methylenecyclohexene, etc.; or with unconjugated cyclic compounds such as pinene, etc.; or with a mixture thereof, without gel formation even under the reaction condition of high content of cyclodiene.

BACKGROUND ART

Heretofore, the process for producing isobutene-cyclodiene copolymers has been well known. In order to appreciate the commercial utility of the copolymer as a rubber, the copolymer should possess appropriate mechanical strength and strong adhesive strength as well as a high number-average molecular weight and a high degree of unsaturation.

It is known that as the number-average molecular weight of the copolymer increases, the copolymer's tensile strength tends to increase, and as the number of unsaturation bond of the copolymer increases, the copolymer's adhesive strength with respect to another rubber tends to increase. In other words, when the copolymer is vulcanized together with highly unsaturated rubber such as natural rubber etc., the adhesive strength of the copolymer increases as the number of unsaturation bond increases and the crosslinking reaction increases and the similarity in crosslinking behavior will also increase.

Isobutene-isoprene copolymer ("butyl rubber") is well known as a representative example of existing isobutene-diene copolymer. But butyl rubber has less than 2.5 mol % of isoprene content as comonomer, which has double bond; thus, it has low number of crosslinking sites which can bond with other rubber. Also its crosslinking reaction behavior is different from the highly unsaturated rubber. All of the above for example, results in its weak adhesive strength which decreases further when exposed to external shock, vibration etc. As a method of improving adhesive strength of butyl rubber, it has been proposed to incorporate halogen compounds into butyl rubber, such as chorine and bromine which can promote the crosslinking reaction, and to increase isoprene content. But in case of the former, investment on additional equipment is required for halogenation process of the resulting polymer after the production of the polymer. In case of the latter, although improved adhesive strength is obtained, there exists the problem of decreasing gas barrier property, which is one of the most desirable properties of butyl rubber. Moreover, U.S. Pat. Nos. 3,356,661, 3,165,503 and 3,466,268 etc. reported that the higher the content of isoprene, the lower the number-average molecular weight and as a result, the copolymer of little utility value is produced. Also it is known that the structure and quantity of the unsaturated bond influence the resistance of rubber against aging. In case of butyl rubber, the degree of unsaturation is lower than that of natural rubber, so it is somewhat stable against aging, but because the site of unsaturation is in the polymer backbone, this polymer is subject to ozone cleavage, thus the aging of rubber cannot be avoided.

On the other hand, in case of isobutene-cyclodiene copolymer which is similar to butyl rubber, improvement in adhesive strength is obtained as well as excellent gas barrier property even at high degree of unsaturation. Even if the unsaturation bond is attacked and cyclic structure is severed, the copolymer backbone will be highly resistant to ozone attack because the diene compound having cyclic structure is copolymerized and the unsaturation bond does not exist on the backbone. Thus the resistance of rubber against aging is excellent and its improved characteristics makes it an excellent tire material. Even though the above-mentioned isobutene-cyclodiene copolymer solved the problem associated with existing butyl rubber and are considered excellent material for tires, the copolymer faces another problem in that it is difficult to maintain the comonomer in high purity because the comonomer is unstable against heat. Also as the degree of unsaturation increases, the gel formation increases and the molecular weight decreases. These problems in preparation have prevented said polymer from being producted for commercial use.

Among processes for preparing isobutene-cyclopentadiene copolymer of the prior slurry polymerization methods, U.S. Pat. No. 2,356,128 produced only copolymers of low molecular weight. U.S. Pat. No. 2,577,822 disclosed a process for preparing terpolymer having high molecular weight which used a divinylbenzene to give crosslinking. U.S. Pat. No. 3,080,337 disclosed a process for preparing isobutene-cyclopentadiene-isoprene terpolymer without gelation and U.S. Pat. No. 3,239,495 disclosed a process for preparing terpolymer of high molecular weight using divinylbenzene.

However, these slurry processes produce a polymer of low molecular weight due to cyclopentadiene dimer (DCPD) and water which were included in their reaction materials, or a polymer of poor physical properties which cannot be used as a commercial product due to the addition of divinylbenzene which increased the crosslinking of the polymer produced.

Although isobutene-cyclopentadiene copolymers having a useful degree of unsaturation and molecular weight can be produced by effectively removing water and dicyclopentadiene from the reaction materials, problems such as gelation and fouling were experienced as the degree of unsaturation and molecular weight of the copolymer increased. Particularly, in a slurry batch polymerization process, it was impossible to produce a polymer having a homogeneous degree of unsaturation because in the initial stage of the polymerization reaction, when cyclopentadiene having a high reaction rate was used, a polymer having a high degree of unsaturation was obtained and gelation was observed.

By conducting a slurry continuous polymerization together with the removal of impurities which would decrease the molecular weight of copolymer, isobutene-cyclopentadiene copolymer without gelation can be produced. However, it was difficult to prevent reactor fouling in a slurry continuous reaction. The technique to extend continuous operation time by preventing fouling is an important index to measure the economical performance of a slurry process.

The problem with gel formation and molecular weight decrease can be solved by the well known solution process, however, it is impossible to obtain high conversion because the viscosity of the reactants increases sharply when the polymerization proceed. Also, in order to obtain high molecular weight of the polymer, the production cost together with the investment cost will increase since the temperature has to be maintained at a level of −120° C.

A number of examples of process for producing isobutene-cyclodiene copolymers by solution process are shown below:

In U.S. Pat. No. 3,808,177, an isobutene-cydopentadiene copolymer having a number-average molecular weight of at least 120,000 and a degree of unsaturation of 8~30 mol % at no more than 10% of conversion, was prepared by carrying out a polymerization reaction using aluminium chloride dissolved in methyl chloride as catalyst and aliphatic saturated hydrocarbon with 5~10 carbon atoms as reaction solvent at polymerization temperature of −120° C.

In U.S. Pat. No. 3,856,763, an isobutene-cyclopentadiene copolymer having a number-average molecular weight of at least 120,000 and a degree of unsaturation of 8~40 mol % at no more than 10% of conversion, was prepared using the chioro or bromo allyl aluminium dihalide with alkyl groups of 1~4 carbon atoms as catalyst at polymerization temperature of −120° C.

In U.S. Pat. No. 4,031,360, an isobutene-cyclopentadiene copolymer having a number-average molecular weight of at least 90,000 and a degree of unsaturation of 8~35 mol % at no more than 10% of conversion, was prepared by carrying out a solution polymerization method using aluminium halide or alkyl aluminium dihalide as catalyst at polymerization temperature of −120° C.

In U.S. Pat. No. 4,139,695, an isobutene-methylcyclopentadiene copolymer having a number-average molecular weight of at least 120,000 and a degree of unsaturation of 8~30 mol % at no more than 5% of conversion, was prepared using alkyl aluminium dichloride as catalyst and methylcyclohexane as reaction solvent at polymerization temperature of −120° C.

Even though an isobutene-cyclodiene copolymer, including cyclopentadiene of which the number-average molecular weight and the degree of unsaturation are high and gel content is low, can be prepared by the solution process, this solution process has several problems as shown below.

In solution process, since the produced copolymer is dissolved in the reaction solvent, the viscosity of the solution increases rapidly as the reaction proceeds, so that the homogeneous mixing of the solution is impossible, and a large amount of power is used for stirring the solution. Also, since the viscosity of the solution increases, it becomes difficult for the solution which serves as a medium for removing reaction heat to transfer the heat to refrigerant and to control the reaction temperature. In particular, a temperature gradient inside the reactor occurs by local temperature increases, so that it is difficult to prepare polymers having homogeneous physical property. Therefore, there is a high risk of producing low quality products.

For preparing polymers having a number-average molecular weight of at least 100,000, the increase of viscosity becomes a bigger problem since the polymerization must be carried out at a extremely low temperature of −120° C. compared to that of slurry process. Further, in order to maintain the low temperature, very large cooling capacity is required, and the amount of refrigerant used must be increased, resulting in an increase of the production cost.

Also, to keep the solution in homogeneous phase at lower polymerization temperature, the required amount of reaction solvent becomes larger; however, the problem of producing lower molecular weight polymers becomes more severe with the increase of the amount of solvent used.

Therefore, in order to overcome the above mentioned problems, the conversion of reaction must be kept as low as 10%. However, in this case, due to the rapid increase of amounts of reactant and solvent which are recycled, the distillation unit and moisture purification unit would have to be enlarged, resulting in increase of the production cost. Further, when conversion of reaction is maintained at a low level, there is a burden to separate and recycle the comonomer since cyclopentadiene does not completely react at low conversion. And, since the reaction solvent is not readily volatilized, high temperature is required for degassing the residual solvent, impairing the double bond in the produced isobutene-cyclodiene copolymer and deteriorating the copolymer's physical property.

DISCLOSURE OF INVENTION

It is the object of the present invention to provide a process for preparing isobutene-cyclodiene copolymers having a high degree of unsaturation and a high molecular weight, without gelation, by slurry process which overcomes the problems of known solution process, said slurry process being more efficient and economical.

Another object of the invention is to provide a process for preparing isobutene-cyclodiene terpolymers which has an improved vulcanization reactivity by introducing a second cyclodiene comonomer.

In order to achieve these objects, the present invention provides a process for preparing copolymer and terpolymer more efficiently and economically by a slurry process, in which the copolymer and terpolymer are prepared using isobutene as a main monomer, and cyclodiene comonomer such as cyclopentadiene, methylcyclopentadiene, methylcyclohexadiene and the like, by itself or in mixtures, without gelation, by slurry polymerization at a temperature from −100° to −85° C. The resulting product possesses remarkably improved adhesive strength, ozone resistance and mechanical properties as compared to the prior bromo-butyl rubber. According to the present invention, high molecular weight isobutene-cyclodiene copolymer having a high conversion rate is prepared by the polymerization reaction of isobutene and cyclopentadiene, methylcyclopentadiene or cyclopentadiene-methylcyclopentadiene mixture. More particularly, the present invention provides a process for preparing of isobutene-cyclodiene copolymers having a number-average molecular weight of at least 100,000 and a degree of unsaturation of 1~30% by mol, said process is characterized in that it is carried out by a polymerization reaction without gelation at a polymerization temperature of −100° C.~−85° C., using 75~99.5% by weight of isobutene and 0.5~25% by weight of a cyclodiene or a mixture of cyclodiene as the reaction materials, and the polar solvent of 1~10 times by weight with respect to the reaction materials as reaction solvent, and using a catalyst solution of 0.02~2% by weight in the polar solvent and the amount of catalyst solution being 0.2~2 times by weight with respect to the reaction material; then removing the residual catalyst activity from the produced polymer at low temperature to obtain isobutene-cyclodiene copolymers having a number-average molecular weight of at least 100,000 and a degree of unsaturation of 1~30% by mol.

The comonomers which are suitable for the invention includes a conjugated diene having a 5-membered ring structure, such as cyclopentadiene, 1-methylcyclopentadiene, 2-methylcyclopentadiene, 1,3-dimethylcyclopentadiene and the like; a conjugated diene having a 6-membered ring structure, such as 1,3- cyclohexadiene, 1-methyl-1,3-cyclohexadiene, 1-methylene-2-cyclohexene, 2-methyl-1,3-cyclohexadiene, 1,3-dimethyl-1,3-cyclohexadiene and the like; a bicyclic compound containing an unsaturated bond, such as pinene, etc or the mixture thereof.

The isobutene-cyclodiene copolymer in which said comonomer is introduced, has high vulcanization performance even at low degree of unsaturation. Thus, it overcomes problems such as deterioration of molecular weight, gelation, and reduction of catalyst efficiency, which are generated when the degree of unsaturation is increased for improving adhesive strength and vulcanization performance in prior art. In the mean time, said copolymer displays a stability of the slurry. Further, at low degree of unsaturation, glass transition temperatures (Tg) of said copolymer is low, and it is possible to prepare higher molecular weight copolymer, which leads to the improved mechanical property of copolymer.

In U.S. Pat. Nos. 3,808,377, 4,031,300 and 4,139,695, which also disclose the process of preparation of isobutene-cyclodiene copolymers, attempts were made to improve the properties of the copolymers by introducing diene or cyclodiene comonomers, but due to characteristics of solution polymerization, the resulted copolymer have either a conversions ratio of as low as 10% or the copolymers obtained have low molecular weights even at a very low temperature of less than $-100°$ C.

Hereinafter, the invention is explained in detail.

Materials used for polymerization in the present invention are isobutene, methylcyclopentadiene and cyclopentadiene, with their respective purities of more than 99%, 97% and 95%; the composition ratio of reaction materials is 75 to 99.5% by weight of isobutene, 0.5 to 25% by weight, preferably 1 to 20% by weight of comonomer.

Because of the thermal unstability and very high reactivity of cyclopentadiene and methylcyclopentadiene, they are spontaneously dimerized into dimers at room temperature. The polymerization conducted in the presence of these dimers in the comonomers, results in molecular weight decrease by blocking chain growth and promotion in gel formation during polymerization. Thus, the introduction of these dimers into the polymerization reaction should be prevented if possible, particularly in the case of high composition ratio of comonomers.

Further, if dicyclopentadiene (the dimers of cyclopentadiene) are presented in large amounts in cyclopentadiene, they will increase the freezing point of reaction mixtures due to the dicyclopentadiene's high freezing point of 33° C. And, at the reaction condition of low temperature they will be partially solidified and thus decrease the homogeneity of polymerization. Accordingly, the dicyclopentadiene are limited to an amount of 5% by weight, preferably of 2% by weight in cyclopentadiene.

As reaction solvents, in order to control the concentration of reaction materials and to remove the heat of reaction, the reaction solvents may be polar solvents, and may be used in an amount from 1- to 10-fold, preferably 2- to 5-fold, by weight with respect to the reaction material. Suitable polar solvents used include alkyl halides having 1 to 3 carbons, preferably alkyl chlorides having 1 to 3 carbons, and more preferably methyl and ethyl chloride.

When the above polar solvents are used as a reaction solvent, polymer produced during the reaction is not soluble in the solvent and remain in a state of slurry, this will restrain the rapid increases in viscosity of reaction mixtures, so that it is possible to remove effectively the reaction heat. Accordingly, it becomes possible to control temperature gradient in a reactor. As a result, the processes have the economic advantages in stirring operation, material transfer, as well as the easiness in maintaining reaction temperature, allowing reaction conversion to be maintained remarkably high, compared to known solution process of prior art.

As to catalysts, they may be catalysts of Lewis acid type, and include preferably aluminum halide, alkyl aluminum dihalide, boron halides or mixtures thereof, and more preferably aluminum chloride, methyl aluminum dichloride, ethyl aluminum dichloride, t-butyl aluminum dichloride, boron fluoride, boron chloride or mixtures thereof. Each catalyst may be used in combination with the desired ratios.

To dissolve and incorporate the catalysts, solvents used may be allyl halides having 1 to 3 carbons, preferably alkyl chlorides, and more preferably methyl and ethyl chloride.

Catalysts are adjusted to the concentrations of 0.02 to 2% by weight, preferably 0.05 to 0.5% by weight, in catalyst solutions, which are used in amount of 0.2- to 2-fold by weight with respect to reaction materials. In cases when catalysts are added in high concentration, local temperature increases due to the heat of vigorous reaction, and thus copolymers of low molecular weights and gels are tend to be produced. Accordingly, the concentration of catalysts should be kept below a certain range.

Water in reaction materials, reaction solvents, or catalyst solutions are known to lower molecular weights, as well as serving as an inhibitor of catalytic activity, thus it should be removed if possible. Accordingly, water in reaction materials, reaction solvents, or catalyst solutions are maintained in amounts of less than 20 ppm, preferably less than 5 ppm, and more preferably 1 ppm.

Reaction temperature is kept in the between $-100°$ to $-85°$ C., preferably between $-97°$ to $-90°$ C. Reactants and catalyst solutions are precooled to about the desired reaction temperature in the precooler via flowmeters, and then added at a constant rate continuously into the reactor of jacket type by fine-tuning valves, and as soon as added into the reactor, they are vigorously stirred so as to be mixed homogeneously. Also, the reactor is pre-charged with reaction solvents and then reactant and catalysts are introduced into the reactor. In doing so, it becomes possible to control the temperature increase due to a radical reaction in the early stage of the reaction, and to prevent the production of copolymers of low molecular weights and gels due to the the local increases in temperature in the reactor.

Polymers, released continuously from the outlet of the reactor, are terminated by using deactivating agents, and then are recovered after drying them in an oven under vacuum. Water and alcohols can be used as the deactivating agents.

Deactivation of residual catalysts should be conducted at low temperature of $-100°$ to $-25°$ C., preferably $-90°$ C. to $-50°$ C., as soon as they are released from the reactor. This is because when the temperature is elevated, the residual catalysts remain active, and copolymers of low molecular weights will be produced by cationic polymerization. Thus deterioration of the properties of the final products may occur. In addition, other type of reactions including gelation, which occur at a extremely slow rate at low temperature, may occur faster as the temperature increases, thus products of which structure is different from those of desired polymers may be produced. Therefore, effective deactivation of residual catalysts depends greatly upon treatment temperature so it is desirable to deactivate the residual catalyst at low temperature near polymerization temperature, immediately as polymers are released from the reactor.

Isobutene-cyclodiene copolymers prepared according to the present invention have number-average molecular weights of more than 100,000 and have unsaturation of 1 to 30% by mol.

BEST MODE FOR CARRYING OUT THE INVENTION

Hereinafter, the present invention is explained in further detail with reference to Examples. However, it should be understood that the following Examples are intended to illustrate the invention without limiting it in any way.

Herein, "gel" means the insoluble part of used copolymer when the copolymer is dissolved in the suitable solvent such as hexane, and "conversion" means weight percent of consumed reaction material to introduced reaction material (isobutene, diene). Further "degree of unsaturation" means the mol % of diene which included in the produced isobutene-cyclobutadiene copolymer.

EXAMPLE 1

2% by weight of cyclopentadiene which includes 1% by weight of dicyclopentadiene and 98% by weight of isobutene was copolymerized using methyl chloride as reaction solvent which has weight ratio of 75:25 with respect to reaction material, with 0.1% by weight of catalyst solution of aluminum chloride dissolved in methyl chloride, weight of solution was 1 times with respect to reaction material, at the reaction temperature of −97° C.

An isobutene-cyclopentadiene copolymer with a number-average molecular weight of 330,000 and a degree of unsaturation of 2.3 mol % was produced. The residual catalyst in the resulting copolymer was deactivated at −90° C. using methanol, and the copolymer was precipitated and then recovered. Gel formation ratio in polymerization reaction was a trace amount of 0.5 weight % or less.

EXAMPLES 2~5

An isobutene-cyclopentadiene copolymer was produced in the same manner as in Example 1, except that dicyclopentadiene contents included in cyclopentadiene and the quantity of cyclopentadiene in the reaction material were changed as shown in Table 1. In Table 1, the molecular weight and degree of unsaturation of the resultant copolymer are shown. Gel formation ratio was a trace amount of 0.5 weight % or less.

Comparative Example 1

Isobutene-cyclopentadiene copolymer was produced in the same manner as in Example 1, except that the dicyclopentadiene contents included in cyclopentadiene was 10% by weight. Copolymer with 214,000 of number-average molecular weight, 2.2 mol % of unsaturation degree, 1.8 weight % of gel formation ratio was obtained. Accordingly, as the dicyclopentadiene contents included in cyclopentadiene increase, the number-average molecular weight tends to reduce and at the same time gel formation ratio tends to increase.

EXAMPLES 6~10

An isobutene-cyclopentadiene copolymer was produced in the same manner as in Example 1, except that the contents of cyclopentadiene in the reaction material and concentration of the catalyst solution were changed as shown in Table 2.

In Table 2, molecular weight and unsaturation degree of the resultant copolymer are shown. Gel formation ratio was a trace amount of 0.5 weight % or less.

TABLE 1

| Example | CPD[1] contents in the reaction material (weight %) | DCPD[2] contents in the CPD (weight %) | Reaction solvent/ reaction material (weight ratio) | Number- average molecular weight | Degree of unsaturation (mol %) | Gel formation ratio (weight %) |
|---|---|---|---|---|---|---|
| 1 | 2 | 1 | 75/25 | 330,000 | 2.3 | trace[3] amount |
| 2 |  | 2 |  | 327,000 | 2.2 | trace amount |
| 3 |  | 5 |  | 297,000 | 2.2 | trace amount |
| 4 | 10 | 1 |  | 177,000 | 11.0 | trace amount |
| 5 |  | 2 |  | 174,000 | 10.7 | trace amount |

Note
[1]CPD means cyclopentadiene.
[2]DCPD means dicyclopentadiene.
[3]a trace amount means 0.5 weight % or less.

TABLE 2

| Example | CPD contents in the reaction material (weight %) | Reaction solvent/ reaction material (weight ratio) | Catalyst solution concentration (weight %) | Number average molecular weight | Degree of unsaturation (mol %) | Gel formation ratio (weight %) |
|---|---|---|---|---|---|---|
| 6 | 2 | 75/25 | 0.3 | 314,000 | 2.3 | trace amount |
| 7 | | | 1.0 | 260,000 | 2.2 | trace amount |
| 8 | 10 | 75/25 | 0.3 | 154,000 | 10.8 | trace amount |
| 9 | | | 1.0 | 134,000 | 10.4 | trace amount |
| 10 | 20 | 75/25 | 0.3 | 108,000 | 21.5 | trace amount |

Comparative Examples 2 and 3

An isobutene-cyclopentadiene copolymer was produced in the same manner as in Examples 6 and 8, except that the respective concentration of catalyst solution was 3.0% by weight. Molecular weight, degree of unsaturation, and gel formation ratio are shown in Table 3. Compared with the results of Table 2, we can see that as the concentration of catalyst solution increases the number-average molecular weight tends to reduce and also gel formation ratio tends to increase.

EXAMPLES 11~15

An isobutene-cyclopentadiene copolymer was produced in the same manner as Example 1, except that the content of cyclopentadiene of the reaction material was changed as shown in Table 5. Molecular weight and degree of unsaturation of the resultant copolymer are shown in Table 5, gel formation ratio being 0.5 weight % or less.

TABLE 3

| Comparative Example | CPD contents in the reaction material (weight %) | Reaction solvent/ reaction material (weight ratio) | Catalyst solution concentration (weight %) | Number average molecular weight | Degree of unsaturation (mol %) | Gel formation ratio (weight %) |
|---|---|---|---|---|---|---|
| 2 | 2 | 75/25 | 3 | 217,000 | 2.2 | 2.5 |
| 3 | 10 | 75/25 | 3 | 82,000 | 10.4 | 7.0 |

Comparative Examples 4~11

An isobutene-cyclopentadiene copolymer was produced in the same manner as in Examples 6 to 10, except that the concentration of the catalyst solution was changed as shown in Table 4, and the residual catalyst was deactivated at room temperature. Molecular weight, degree of unsaturation, and gel formation ratio of the resultant copolymer are shown in Table 4. Compared with the Table 2, we can see that the gel formation ratio is considerably higher, and the removal of catalytic activity should effect quickly at near the low polymerization temperature.

TABLE 4

| Comparative Example | CPD contents in the reaction material (weight %) | Reaction solvent/ reaction material (weight ratio) | Catalyst solution concentration (weight %) | Number average molecular weight | Degree of unsaturation (mol %) | Gel formation ratio (weight %) |
|---|---|---|---|---|---|---|
| 4 | 2 | 75/25 | 0.3 | 298,000 | 2.2 | 0.8 |
| 5 | | | 1.0 | 212,000 | 2.2 | 1.9 |
| 6 | | | 3.0 | 185,000 | 2.3 | 3.7 |
| 7 | 10 | 75,25 | 0.3 | 127,000 | 11.0 | 1.6 |
| 8 | | | 1.0 | 96,000 | 10.5 | 3.2 |
| 9 | | | 3.0 | 66,000 | 10.7 | 16.0 |
| 10 | 10 | 75,25 | 0.3 | 84,000 | 21.6 | 2.3 |
| 11 | | | 1.0 | 57,000 | 21.8 | 6.8 |

TABLE 5

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 11 | 1 | 75/25 | 0.1 | −97 | 482,000 | 1.0 |
| 12 | 2 | | | | 327,000 | 2.3 |
| 13 | 5 | | | | 240,000 | 5.2 |
| 14 | 10 | | | | 174,000 | 10.4 |
| 15 | 20 | | | | 132,000 | 24.7 |

EXAMPLES 16~20

An isobutene-cyclopentadiene copolymer was produced in the same manner as Example 11~15, except that the reaction temperature was changed to −92° C. Molecular weight and degree of unsaturation of the resultant copolymer are shown in Table 6, gel formation ratio being 0.5 weight % or less.

TABLE 6

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 16 | 1 | 75/25 | 0.1 | −92 | 298,000 | 1.0 |
| 17 | 2 | | | | 210,000 | 2.3 |
| 18 | 5 | | | | 177,000 | 5.3 |
| 19 | 10 | | | | 129,000 | 10.4 |
| 20 | 20 | | | | 103,000 | 23.5 |

EXAMPLES 21~23

An isobutene-cyclopentadiene copolymer was produced in the same manner as Example 11, 13 & 14, except that ethyl chloride was used as a reaction solvent. Molecular weight and unsaturation level of the resultant copolymer are shown in Table 7, gel formation ratio being 0.5 weight % or less.

TABLE 7

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 21 | 1 | 75/25 | 0.1 | −97 | 430,000 | 1.0 |
| 22 | 5 | | | | 244,000 | 5.1 |
| 23 | 10 | | | | 165,000 | 10.8 |

EXAMPLES 24~26

An isobutene-cyclopentadiene copolymer was produced in the same manner as Examples 11, 13 & 14, except that ethyl aluminium chloride was used as a catalyst.

Molecular weight and unsaturation level of the resultant copolymer are shown in Table 8, gel formation ratio being 0.5 weight % or less.

TABLE 8

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 24 | 1 | 75/25 | 0.1 | −97 | 444,000 | 1.0 |
| 25 | 5 | | | | 237,000 | 5.2 |
| 26 | 10 | | | | 179,000 | 10.3 |

EXAMPLES 27~29

An isobutene-cyclopentadiene copolymer was produced in the same manner as Example 11, 13 & 14, except that boron fluoride was used as a catalyst. Molecular weight and unsaturation level of the resultant copolymer are shown in Table 9, gel formation ratio being 0.5 weight % or less.

EXAMPLES 36~41

An isobutene-cyclodiene copolymer was produced by performing polymerization reaction at the temperature of −97° C., using 0.1% by weight of catalyst solution of aluminum chloride dissolved in methylchloride, the weight of solution being 1 times with respect to the reaction material, using methylcyclopentadiene and cyclopentadiene as comonomer and methylchloride as the reaction solvent which is 3 times by weight with respect to the reaction material thereof. The residual catalyst in the resulting copolymer was deactivated at −80° C. using methanol, and the copolymer was precipitated and then recovered.

TABLE 9

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 27 | 1 | 75/25 | 0.1 | −97 | 501,000 | 1.0 |
| 28 | 5 | | | | 242,000 | 5.3 |
| 29 | 10 | | | | 169,000 | 10.6 |

EXAMPLES 30~32

An isobutene-cyclopentadiene copolymer was produced in the same manner as Example 4, except that the ratio of reaction solvent to the reaction material was changed as shown in Table 10. Molecular weight and unsaturation level of the resultant copolymer are shown in Table 10, gel formation ratio being 0.5 weight % or less.

TABLE 10

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 30 | 10 | 50/50 | 0.1 | −97 | 168,000 | 10.7 |
| 31 | | 75/25 | | | 174,000 | 10.7 |
| 32 | | 85/15 | | | 172,000 | 10.2 |

EXAMPLES 33~35

An isobutene-cyclopentadiene copolymer was produced in the same manner as Example 4 except that the catalyst solution concentration was changed as shown in Table 11. Molecular weight and unsaturation degree of the resultant copolymer are shown in Table 11, gel formation ratio being 0.5 weight % or less.

TABLE 11

| Example | CPD contents in the reaction material (weight %) | Reaction solvent/ reaction material (weight ratio) | Catalyst solution concentration (weight %) | Polymerization Temp. (°C.) | Number Average Molecular weight | Degree of unsaturation (mol %) |
|---|---|---|---|---|---|---|
| 33 | 10 | 75/25 | 0.05 | −97 | 170,000 | 10.3 |
| 34 | | | 0.1 | | 171,000 | 10.4 |
| 35 | | | 0.3 | | 154,000 | 10.4 |

TABLE 12

| Example | MCPD[4] contents in the reaction material (weight %) | CPD contents in the reaction material (weight %) | Reaction solvent/ reaction material (weight ratio) | Catalyst solution concentration (weight %) | Number Average Molecular weight | Degree of unsaturation (mol %) |
|---|---|---|---|---|---|---|
| 36 | 2 | — | 75/25 | 0.1 | 294,000 | 2.3 |
| 37 |   | 3 |   |   | 221,000 | 5.5 |
| 38 |   | 5 |   |   | 182,000 | 7.5 |
| 39 | 5 | — |   |   | 216,000 | 5.7 |
| 40 |   | 3 |   |   | 169,000 | 8.9 |
| 41 |   | 5 |   |   | 140,000 | 11.3 |

Note.
[4]MCPD means methylcydopentadiene.

EXAMPLES 42~45

An isobutene-cyclodiene copolymer was produced in the same manner as Examples 37, 38, 40 and 41, except that the reaction temperature was −92° C.

TABLE 13

| Example | MCPD contents in the reaction material (weight %) | CPD contents in the reaction material (weight %) | Reaction solvent/ reaction material (weight ratio) | Catalyst solution concentration (weight %) | Number Average Molecular weight | Degree of unsaturation (mol %) |
|---|---|---|---|---|---|---|
| 42 | 2 | 3 | 75/25 | 0.1 | 173,000 | 5.4 |
| 43 | 2 | 5 |   |   | 147,000 | 7.5 |
| 44 | 5 | 3 |   |   | 136,000 | 9.1 |
| 45 | 5 | 5 |   |   | 121,000 | 11.4 |

EXAMPLE 46

An isobutene-cyclodiene copolymer was produced in the same manner as Example 37 except that the reaction solvent was ethylchloride, and the resultant polymer had a number-average molecular weight of 205,000 and a degree of unsaturation of 5.5 mol. %.

EXAMPLE 47

An isobutene-cyclodiene copolymer was produced in the same manner as Example 37 except that the weight ratio of reaction solvent/eaction material was 85/15, and the resultant polymer has a number-average molecular weight of 220,000 and a degree of unsaturation of 5.5 mol. %.

EXAMPLE 48

An isobutene-cyclodiene copolymer was produced in the same manner as Example 37 except that the concentration of catalyst solution was 0.3% by weight, and the resultant polymer had a number-average molecular weight of 208,000 and a degree of unsaturation of 5.6 mol. %.

EXAMPLES 49~51

An Isobutene-cyclopentadiene copolymer was produced in the same manner as Example 37 except that catalyst was changed as shown in Table 14.

TABLE 14

| Example | CPD contents in the reaction material (weight %) | MCPD contents in the reaction material (weight %) | Reaction solvent/ reaction material (weight ratio) | Catalyst/ catalyst solution | Number Average Molecular weight | Degree of unsaturation (mol %) |
|---|---|---|---|---|---|---|
| 49 | 3 | 2 | 75/25 | Aluminum bromide /methyl chloride | 203,000 | 5.6 |
| 50 |   |   |   | Boron fluoride. isobutanol/ methyl chloride | 217,000 | 5.5 |
| 51 |   |   |   | Ethyl aluminum dichloride/methyl chloride | 208,000 | 5.7 |

As shown in the Table above, isobutene-cyclodiene copolymers having a number-average molecular weight not less than 100,000, an unsaturation degree of 1~30% by mol and a gel formation ratio of 0.5% by weight or less can be produced without gel formation according to the present invention by performing polymerization reaction at the temperature of −100°~85° C., using aluminium halide, alkyl aluminium dihalide and boron halide as catalyst and polar solvent of 1~10 times by weight with respect to the reaction material as reaction solvent; said reaction solvent serves to control the concentration of reactant and to remove the reaction heat in order to prevent dissolution of the resultant polymer. The residual catalyst activity in polymer effluent is instantly deactivated after polymerization is carried out by reacting isobutene with cyclopentadiene or methylcyclopentadiene.

We claim:

1. A process for preparing isobutene-cyclopentadiene-methylcyclopentadiene terpolymers having a high number-average molecular weight by reacting isobutene, cyclopentadiene and methylcyclopentadiene at low temperature, wherein the isobutene-cyclopentadiene-methylcyclopentadiene terpolymers have a number-average molecular weight of at least 100,000 and an unsaturation of 3 to 20 percent by mol, characterized in that a continuous slurry polymerization is carried out without gelation and fouling by reacting 85 to 98 percent by weight of isobutene and 2 to 15 percent by weight of a mixture of cyclopentadiene and methylcyclopentadiene as reaction materials, in a polar reaction solvent of alkylhalide of 1 to 10 times by weight with respect to the reaction materials, wherein a catalyst solution of 0.02 to 2 percent by weight is used in the amount of 0.2 to 2 times by weight with respect to the reaction materials, at a reaction temperature of −100° to −85° C. to produce a terpolymer, the catalyst in said catalyst solution being deactivated at a temperature of −100° to −25° C., wherein dimer content in the cyclopentadiene and the methylcyclopentadiene is at most 2 percent by weight, and water content in the reaction materials, the reaction solvents or the catalyst solutions are maintained in amounts of less than 20 ppm.

2. A process for preparing isobutene-cyclopentadiene-methylcyclopentadiene terpolymers according to claim 1, characterized in that the reaction temperature is −97° to −90° C.

3. A process for preparing isobutene-cyclopentadiene-methylcyclopentadiene terpolymers according to claim 1 characterized in that the residual catalyst activity is removed at the temperature of −90° to −50° C.

4. A process for preparing isobutene-cyclopentadiene-methylcyclopentadiene terpolymers according to claim 1 characterized in that an alkyl halide containing 1 to 3 carbon atom(s) is used as the reaction solvent.

5. A process for preparing isobutene-cyclopentadiene-methylcyclopentadiene terpolymers according to claim 4 characterized in that methylchloride or ethylchloride is used as the reaction solvent.

6. A process for preparing isobutene-cyclopentadiene-methylcyclopentadiene terpolymers according to claim 4 or 5 characterized in that the reaction solvent is used in the amount of 2 to 5 times by weight of the reaction materials.

7. A process for preparing isobutene-cyclopentadiene-methylcyclopentadiene terpolymers according to claim 1 characterized in that aluminium halide, alkyl aluminum dihalide, boron halide, or a mixture thereof is used as the catalyst.

8. A process for preparing isobutene-cyclopentadiene-methylcyclopentadiene terpolymers according to claim 7 characterized in that aluminum chloride, aluminum bromide, ethyl alulminum dichloride, boron fluoride, or a mixture thereof is used as the catalyst.

9. A process for preparing isobutene-cyclopentadiene-methylcyclopentadiene terpolymers according to claim 7 or 8 characterized in that the concentration of the catalyst in a catalyst solution is 0.05 to 0.5% by weight.

* * * * *